United States Patent Office 3,787,531
Patented Jan. 22, 1974

3,787,531
PRESSURE-SENSITIVE ADHESIVES COMPRISING A BLOCK COPOLYMER AND A TACKIFIER
Carl A. Dahlquist, Roseville, and Vasant V. Kolpe, St. Paul, Minn., assignors to Minnesota Mining and Manufacturing Company, St. Paul, Minn.
No Drawing. Continuation-in-part of application Ser. No. 813,735, Apr. 4, 1969. This application May 24, 1971, Ser. No. 146,473
Int. Cl. C08f 41/12
U.S. Cl. 260—876 B    12 Claims

ABSTRACT OF THE DISCLOSURE

Normally tacky pressure-sensitive adhesives and adhesive tapes having excellent shear strength and creep resistance, particularly at elevated temperatures, together with good peel strength and tack properties, are obtained by combining tackifying resin with low molecular weight A–B block copolymer. The copolymer A block is normally glassy and has a glass transition temperature above 75° C. while the copolymer B block is amorphous and elastomeric at temperatures above −20° C. Shear strength of the adhesive may be increased by addition of block copolymers containing three or more blocks.

BACKGROUND OF THE INVENTION

This application is a continuation-in-part of copending application Ser. No. 813,735, filed Apr. 4, 1969, now abandoned.

The invention relates to normally tacky pressure-sensitive adhesive compositions and adhesive tapes.

Normally tacky pressure-sensitive adhesive suitable for use in adhesive tapes must have the requisite four-fold balance of adhesion, cohesion, stretchiness, and elasticity. Those pressure-sensitive adhesives utilized in such products as filament tape (a high tensile strength tape used to seal heavy cartons or to bind heavy objects such as bundles of pipe for shipment), and double coated foam tape (which is frequently used to mount objects on vertical wall surfaces) must also have shear strength greater than that of the average pressure-sensitive adhesive.

Pressure-sensitive adhesives having shear strength suitable for use in filament tape and foam tape are normally obtained by use of high molecular weight (above about 500,000) viscoelastic polymers, the viscosity of which, and thus the shear strength at low rates of shear, increases markedly with molecular weight. However, high molecular weight polymers, unless extensively milled, produce high viscosity adhesive solutions which are difficult to use in tape coating equipment.

It is possible to obtain low viscosity coatable adhesive solutions by utilizing low molecular weight polymers; however, these polymers have not been found useful for that purpose, because they fail cohesively when peeled from a surface. Pressure-sensitive adhesives that fail cohesively leave a gummy, sticky residue on the substrate and are totally useless for commercial pressure-sensitive tapes. For example, adhesives made from 100,000 molecular weight cis-polyisoprene fail cohesively, as do adhesives made from styrene-butadiene copolymer of about 72,000 molecular weight ("Solprene"—1205). This is pointed out in U.S. Pat. No. 3,519,585, to Miller, wherein a styrene-butadiene rubbery copolymer having a polystyrene block on one end of the polymer molecule was added to a first copolymer as a tackifying agent. The block copolymer comprises a copolymer of (a) 1,3-butadiene, isoprene or piperylene and (b) a vinyl-substituted aromatic hydrocarbon, and a homopolymer of a vinyl-substituted aromatic hydrocarbon, the homopolymer preferably comprising a polystyrene block at one end of the molecule. It was stated in Miller that the tackification results because of the random styrene which is present in the butadiene segment of the polymer chain. In other words, monomers from one block (styrene) are solubilized in the other block (butadiene-styrene, etc.) as the styrene in the butadiene-styrene block enhances the co-solubility of the two blocks. By mixing the different monomers in the two blocks, the strength of the styrene domains of one block (glassy block) is diminished and, thus, the cohesive strength of the adhesive is diminished. Miller states in column 6, lines 28–30, that for his purposes adhesion is good when the adhesive fails cohesively. Such loss of cohesive strength is quite undesirable for most adhesive applications, however, particularly for application in the present invention.

Shear strength adequate for filament and foam tapes can be obtained from low molecular weight viscoelastic polymers (while maintaining low solution viscosities) by means of in situ chemical cross-linking. However, chemical cross-linking requires excessively careful control to achieve adequate shear strength without loss of quickstick and adhesion, the cross-linking reaction frequently slowly continuing and impairing the adhesive's shelf-life and tack properties.

Despite the desirability of compounding commercially acceptable pressure-sensitive adhesives having low solution viscosity and shear strength adequate for filament and foam tapes without chemical cross-linking, such an adhesive has never heretofore existed.

SUMMARY OF THE INVENTION

The invention provides normally tacky pressure-sensitive adhesives and adhesive tapes having the requisite four-fold balance of adhesion, cohesion, stretchiness, and elasticity, good peel strength and tack properties plus excellent shear strength and creep resistance, particularly at elevated temperatures. The excellent shear strength of these adhesives makes them particularly suited for use on high shear strength filament tapes and double coated foam tapes. These adhesives dissolve in ordinary adhesive solvents, without milling, to provide low viscosity adhesive solutions readily coatable on tape backings, all without chemical cross-linking.

In accordance with the invention, any low molecular weight A–B type block copolymer as defined herein may be blended with effective amounts of compatible tackifying resin to provide adhesives having the above-mentioned properties. A–B block copolymers are made up of two distinct polymer blocks joined together, each of which may itself be either a homopolymer or copolymer. However, in no case can a monomer of one block integrate or mix with the other block. In the A–B block copolymers useful in this invention, A designates a thermoplastic polymeric block which is glassy, having a glass transition temperature above about 75° C., as determined by torsion pendulum (ASTM Test D–2236–64%). There is no mixture of the two blocks as discussed with reference to the Miller patent, supra. Each block remains pure with no co-solubilization therebetween.

B designates a thermoplastic polymeric block that is substantially amorphous and elastomeric at temperatures above about −20° C. and has a glass transition temperature below about −20° C., as determined by torsion pendulum. These block copolymers exhibit extraordinarily high viscosities at low rates of shear, and thus high shear strength, even when they exhibit very low tensile strengths (as low as 50 p.s.i.), and are soluble in solvents which will dissolve the polymers used to form each block. The overall properties of a given block copolymer are dependent upon the particular polymers used in the A and B blocks, and the relative size of the blocks. These A–B block copolymers retain their excellent shear strength and creep resistance up to the temperature at which the A block begins to flow. For effective use in pressure-sensitive adhesives, the A–B block copolymer should have a molecular weight of at least about 75,000 preferably at least about 100,000.

The term "substantially amorphous and elastomeric" characterizes those polymers which do not have any crystallinity in the undeformed state as determined by X-ray analysis, and which display elastomeric properties such as an elongation of at least 100%, a tensile modulus less than about $2 \times 10^8$ dynes/cm.$^2$ at 100% extension when stretched at a rate of 2000% per minute, and a recovery of at least 50% within 1 second of load removal. The term "glassy" characterizes those polymers which are amorphous and have a modulus of rigidity in excess $5 \times 10^9$ dynes/cm.$^2$ (ASTM Test D-2236-64T).

The criterion of glass transition temperature has been recognized and used for many years to characterize polymers. This temperature, at which segments of the polymer chain become mobile, can be determined by "thermodynamic" measurements, such as differential thermo-analysis, heat capacity, dilatometry, or by mechanical apparatus such as the torsion pendulum. The torsion pendulum is preferred because it is convenient, rapid, reliable, reproducible, and requires only a small sample. Reported or measured transition temperatures for homopolymers, prepared from typical monomers preferred for use in these block polymers are listed in Table I.

TABLE I

| Polymer: | Transition temperature, ° C. |
|---|---|
| Polystyrene | 100 |
| Polytert-butylstyrene | 130 |
| Poly-2-vinylpyridine | 104 |
| Polymethylmethacrylate | 105 |
| Polyalphamethylstyrene | 165 |
| Cis-polyisoprene | −70 |
| Cis-polybutadiene | −108 |

Each A block is a discrete polymer formed from one or more monomers, any monomer selected for polymerization of an A block being such that it is capable of homopolymerization to yield a glassy polymer exhibiting a glass transition temperature above about 75° C. as determined by torsion pendulum. As noted heretofore, polymerization to a glassy polymer is essential for high cohesive strength and, thus, high shear strength. The monomers of each individual block do not mix or solubilize. The domains of each block must remain "pure" or undiluted with monomers of the other block to insure such strength. Each A block must be polymerized to a number average molecular weight of at least about 15,000, preferably at least about 30,000. To exhibit hyper-shear strength, the molecular weight of the A block should be between about 20% to 50%, preferably between about 30% to 35% of the total molecular weight of the block polymer. Preferred monomers for polymerization of homopolymer A blocks are those organic compounds containing the $>C=CH_2$ group, examples of which are: methyl methacrylate, and mono vinyl substituted aromatics such as styrene, alphamethyl styrene, tert-butyl styrene, 2-vinyl pyridine, vinyl toluene, vinyl naphthalene, vinyl xylene, etc.

Each B block is a discrete polymer formed from one or more monomers, any monomer selected for a B block being such that it is capable of homopolymerization (not capable of mixing with monomers of the A block) to yield a polymer amorphous and elastomeric at temperatures above −20° C., and having a glass transition temperature below about −20° C., as determined by torsion pendulum. Each B block must be polymerized to a number average molecular weight of at least 35,000, preferably at least 50,000. Preferred monomers for polymerization of B blocks are conjugated dienes such as isoprene and butadiene. Once polymerized, polybutadiene and polyisoprene B blocks may be hydrogenated to provide still other B blocks.

A-B block copolymers are compatible with a wide variety of tackifying resins, particularly those tackifiers that have been found to be useful in the art for tackifying polymers of the type used in the B block. The choice of tackifying resin is determined by degree of tack desired, softening point desired, and compatibility with such other components as extender oils, stabilizers, plasticizers, pigments, etc. The amount of tackifying resin utilized varies with the particular polymer and the end use, and can range from about 10 to about 150 parts of resin per 100 parts of A-B polymer. A-B block copolymers which are not inherently tacky require about 10 to about 150, preferably about 25 to about 80 parts of resin per 100 parts of A-B polymer. Suitable tackifying resins include polyterpene, terpenephenolic, hydrogenated rosin, esters of hydrogenated rosin, esterified wood resin, stabilized ester resin, styrene copolymers, hydrocarbon resins, and chlorinated hydrocarbon resins, are well known in the art. Hydrocarbon resins useful for purposes of the present invention are those having a molecular weight less than 2000 and selected from the group consisting of copolymers from mixtures of unsaturated hydrocarbons derived from coal tar; copolymers derived from petroleum; polymers derived from one or more terpenes; and condensation products of aromatic hydrocarbons with formaldehyde.

If desired for a particular end use, it is possible to increase the shear strength and tensile strength of these adhesive compositions by addition of minor amounts of multiblock copolymers having three or more blocks. Examples of these copolymers are such as A-B-A (U.S. Pat. 3,265,765), A-B-A', A-B-A-B-A, or A'-A-B-A'..., wherein A is a glassy block as defined herein; B is an elastomeric block as defined herein; and A' is a glassy block as defined for A herein but each of A and A' consisting of different monomers. The A and A' blocks are typically polymers of vinyl aryls such as styrene, alpha-methyl styrene, tert-butyl styrene, vinyl toluene, vinyl naphthalene, and 2-vinyl pyridine, or a monomer such as methyl methacrylate. The B blocks are typically polymers of conjugated dienes such as butadiene and isoprene. Addition of less than about 30, preferably less than about 25, parts by weight of multi-block copolymer per 100 parts of total polymer, increases the adhesive shear strength, particularly at elevated temperatures. Tensile strength is also increased in this manner without severely affecting tack and quick-stick properties.

While applicants do not wish to be bound by theoretical considerations, a credible explanation of the hyper-shear strength exhibited by these A-B block copolymers resides in the ability of a number of A blocks to associate as a distinct group or "domain." Each associated group has a central domain of A blocks which exhibits the high glass transition temperature characteristic of the polymers in the A block. This is primarily why it is so important that the A block domains are not "diluted" with monomers of the B block. Amorphous and elastomeric B blocks emanate from the domain and entangle with B blocks emanating from adjacent domains. Under shear stress, several entangled domains and associated B blocks move as a group, exhibiting a viscosity which is characteristic of the additive molecular weight of the copolymers in each group, rather than of the molecular weight of the individual copolymer molecules making up a domain.

The ability of A blocks to associate into groups is contingent upon such factors as molecular weight of the A block, and the degree of mutual insolubility of the A and B blocks into each other. The A blocks, which are not soluble with the B blocks, have a high degree of asociation even at relatively low molecular weights. It is generally not desirable to have A blocks with a molecular weight below about 15,000; conversely, it is frequently desirable to use A blocks of at least about 45,000 molecular weight to achieve the degree of association needed for superlative shear strength.

Viscosity of A-B block copolymers at low shear rate is also influenced by the molecular weight of the amorphous, elastomeric B block. The higher the molecular weight of a B block, the higher the viscosity of the A-B block copolymer at any given degree of association, presumably because of a greater degree of entanglement with B blocks emanating from adjacent domains. It has been found by experiment that it is generally desirable to have B blocks of such length that their molecular weight is at least about 35,000, preferably at least about 50,000.

It is thought that addition of multiblock copolymer effects a "physical" cross-linking by providing B blocks which are linked to A blocks in adjacent domains. While the primary reason for adding a multi-block copolymer is to augment tensile strength, an attendant beneficial increase in shear strength is also realized, particularly at elevated temperatures. This "physical" cross-linking has an important advantage over chemical cross-linking in that it is readily controlled and does not continue to cross-link after the adhesive has been applied to a tape backing.

The following examples, in which all parts are by weight unless otherwise noted, illustrate preparation of the polymers and adhesives of this invention, without limiting the scope thereof.

DESCRIPTION OF THE PREFERRED EMBODIMENTS

Examples 1–8

These examples illustrate preparation of A-B block copolymer, adhesives therefrom, and tapes. The A block is polystyrene having a molecular weight of about 57,000 and the B block is polyisoprene having a molecular weight of about 121,000.

A 5 liter indented, split flask was fitted with a stainless steel stirrer, calibrated addition flask, and gas inlet. The flask was flamed and purged with argon, after which 3,700 ml. of cyclohexane, previously dried over silica gel, was added, with 100 ml. being distilled out and discarded. Three hundred thirty-six grams (495 ml.) of isoprene (previously washed with 10% sodium hydroxide and dried over silica gel under argo) was added to the flask at 39° C., the flask cooled to 34° C. and 2.81 ml. of an n-hexane solution of sec-butyl lithium (0.073 g./cc., Lithium Corporation of America) added, the solution turning a very slight yellow color and the solution temperature increasing to 40° C. in about ten minutes. The solution was then heated to 59° C. for 24 hours, gradually turning light yellow, after which 145 gms. (160 ml.) of styrene, previously washed under argon with 10% sodium hydroxide and dried over silica gel, was added to the flask, the solution instantly turning dark orange. Polymerization was continued for 1½ hours at 59° C., after which 5 ml. of methyl alcohol and 10 gms. of 2,6-ditertiarybutyl paracresol ("Ionol" antioxidant, Shell Chemical Company) was added.

The 15% solids polymer solution was almost clear with a faint white haziness and had a Brookfield viscosity of 18,000 cps. at 23° C. The A-B polymer, recovered in 99% yield, had a 32% styrene content as determined by nuclear magnetic resonance, in intrinsic viscosity of 1.0 dl./g. as determined in toluene at 23° C., a number average molecular weight of 178,000 as determined by high speed membrane osmometry, and a tensile strength of 95 lbs./in.$^2$.

A-B block copolymer, polyterpene tackifying resin, ("Piccolyte" S-115, Pennsylvania Industrial Chemical Corp.) and multi-block copolymers were combined in the ratios shown in Table II, each adhesive being prepared at 16% solids in cyclohexane. The multi-block copolymer was an A-B-A type copolymer of polystyrene-polyisoprene-polystyrene having a molecular weight of about 130,000 and a 19% styrene content ("Kraton" 107, Shell Chemical Company). Three prior art pressure-sensitive adhesives were prepared as controls by compounding (1) 100 parts of styrene-butadiene rubber (250,000 molecular weight, GRS-1011) with 45 parts of glyceryl ester of polymerized rosin ("Polypale Ester 10," Hercules Inc.) at 22% solids in heptane, (2) 100 parts of cis-polyprene (anionic, 500,000 molecular weight) with 75 parts of poly-β-pinene resin ("Piccolyte" S-115, Pennsylvania Industrial Chemical Corp.), and (3) 100 parts of styrene-butadiene copolymer (about 72,000 molecular weight, "Solprene" 1205, Phillips Petroleum Co.) with 75 parts of polyterpene resin (S-1010, Hercules Corporation) in cyclohexane at 18% solids.

TABLE II.—ADHESIVE FORMULATIONS

| Example | Grams of A-B block copolymer | Grams of tackifier | Grams of A-B-A block copolymer |
|---|---|---|---|
| 1 | 10 | 4 | |
| 2 | 10 | 4 | 0.435 |
| 3 | 10 | 4 | 0.895 |
| 4 | 10 | 4 | 1.385 |
| 5 | 10 | 4 | 2.0 |
| 6 | 10 | 6 | 2.0 |
| 7 | 10 | 8 | 2.0 |
| 8 | 10 | 4 | 3.14 |

Shear strength, peel strength, and tack properties were determined for these adhesives by preparing and testing tapes, each individual adhesive being coated on a 1.5 mil. biaxially oriented polyester film backing and dried at 65° C. to provide tapes having the coating weights shown in Table III. Shear strength was determined by adhering a ½ in. x ½ in. area of tape to a stainless steel substrate, suspending a 1000 gm. load from the tape, and measuring the time for the tape to fail in shear by coming loose from the substrate at both 23° C. and at 49° C. Peel strength was determined by adhering a ½ in. wide strip of tape to a polished steel substrate and peeling one end of the tape back on itself at an angle of 180° (ASTM D–1000). Tack properties were determined by means of a ⅟₁₆ in. diameter polished stainless steel probe [ASTM 221 (64) 1957] in a "Polyken" probe tack tester, the probe being adhered to the adhesive by a static weight of 100 gms./cm.$^2$ for 1 second and removed at a ratio of 0.5 cm./sec. The results of these tests (Table III) indicate that pressure-sensitive adhesives made from low molecular weight A-B block copolymers have excellent shear strength, peel strength, and tack properties. In the tables, the symbol > indicates that the test, though still adhering satisfactorily, was discontinued because of limited equipment.

TABLE III.—ADHESIVE PROPERTIES

| | Coating weight, grains/24 in.$^2$ | 180° peel adhesion, oz./½" | Shear adhesion, min./½" at— | | Probe tack, gms. |
|---|---|---|---|---|---|
| | | | 23° C. | 49° C. | |
| Control No.: | | | | | |
| 1 | 7 | 35 | 10 | 1.5 | |
| 2 | 6.8 | 37 | 8 | | |
| 3 | 6.2 | 16 | 4 | 0.5 | |
| Example No.: | | | | | |
| 1 | 6.6 | 26 | 42 | 6.6 | 50 |
| 2 | 5.4 | 31 | 608 | 41 | |
| 3 | 7 | 41 | >10,000 | 342 | |
| 4 | 5.8 | 40 | >7,680 | 2,052 | |
| 5 | 6.8 | 37 | >4,292 | 4,245 | 50 |
| 6 | 7 | 37 | >4,282 | 1,808 | 20 |
| 7 | 6.7 | 40 | >4,275 | 338 | 50 |
| 8 | 6.9 | 26 | >1,000 | >1,000 | |

Examples 9–12

These examples illustrate preparation of an A–B block copolymer, adhesives, therefrom, and tapes. The A block is polystyrene having a molecular weight of about 45,000 and the B block is polybutadiene having a molecular weight of about 105,000.

Twenty-five hundred ml. of cyclohexane, previously dried over and distilled from lithium styryl in an argon atmosphere, was charged to the apparatus of Example 1, and 100 ml. distilled out. Then, 98.75 gms. (109 ml.) of styrene, previously washed with 10% NaOH and dried over silica gel under argon, and 0.767 ml. (0.183 gm./cc.) of sec-butyl lithium solution were added at 51° C., the solution quickly turning a dark orange. After 40 minutes, 230.25 gms. of butadiene (99.5% minimum purity, Phillips Petroleum Company), previously dried over and distilled from tri-isobutyl aluminum, was added over a period of 1½ hours at a temperature of 48–52° C. Polymerization was continued, with stirring, for three additional hours after which 5 ml. of methyl alcohol and 3.29 gms. of 2,6-ditertiary butyl para cresol ("Ionol" antioxidant, Shell Chemical Co.) were added. The A–B polymer solution was a faint yellow color, 16.1% solids, and had a Brookfield viscosity of 8,170 cps. at 23° C. The polymer was recovered in 100% yield and had an inherent viscosity of 1.2 dl./gm.

The A–B block copolymer, polyterpene tackifying resin (S–1010, Hercules Inc.), and multi-block copolymer were combined at 16% solids in cyclohexane in the ratios shown in Table IV. The multi-block A–B–A copolymer was polystyrene-polybutadiene-polystyrene of about 15,000–70,000–15,000 molecular weight ("Kraton" 101, Shell Chemical Co.).

TABLE IV.—ADHESION FORMULATIONS

| Example | Grams of A–B block copolymer | Grams of tackifier | Grams of A–B–A block copolymer |
|---|---|---|---|
| 9 | 10 | 7.5 | |
| 10 | 10 | 10 | |
| 11 | 10 | 8.25 | 1 |
| 12 | 10 | 12 | 2 |

Shear strength, peel strength, and tack properties were determined for each of these adhesives in the same manner utilized in Examples 1–8. The test results (Table V) indicate that these low molecular weight A–B block copolymers provide excellent pressure-sensitive adhesives having outstanding shear strength.

TABLE V.—ADHESIVE PROPERTIES

| Example number | Coating weight, grains/24 in.² | 180° peel adhesion, oz./½″ | Shear adhesion, min./½″ at 23° C. | Shear adhesion, min./½″ at 49° C. | Probe tack, gms. |
|---|---|---|---|---|---|
| 9 | 6.8 | 20 | >3,000 | 318 | 45 |
| 10 | 6.8 | 26 | | 109 | 60 |
| 11 | | 51 | >3,980 | | 60 |
| 12 | 6.5 | 42 | >3,500 | | 50 |

Examples 13–15

These examples illustrate preparation of an A–B block copolymer, adhesives therefrom, and tapes. The A block is poly tert-butyl styrene having a molecular weight of about 30,000 and the B block is polybutadiene having a molecular weight of about 100,000. A 3-liter 5-neck flask was fitted with a Dry Ice condenser, stirrer, dropping funnel, gas inlet tube, and rubber septum, after which 900 ml. of dry cyclohexane was added and heated to 60° C. with stirring. Then, 0.6 ml. of sec-butyl lithium in dry cyclohexane (0.9 moles/liter) and 18 gms. of freshly distilled tert-butyl styrene were added and the temperature maintained at 60° C. for 40 min., the solution turning yellow and then golden. Purified butadiene (60 gms.) was introduced over a 35 min. period, the solution becoming light yellow. The temperature was maintained at 70° C., with cooling, for 30 additional minutes, and cooled to room temperature, with stirring. The polymer, which had in inherent viscosity of 1.8 dl./gm., was precipitated in methanol, and the polymer collected and dried. Seventy-five gms. of polymer was recovered.

A–B block copolymers, polyterpene tackifier (S–1010, Hercules Inc.) and multiblock copolymer were combined in the ratios shown in Table VI, each adhesive being prepared at 16% solids in toluene. The multi-block A–B–A block copolymer was poly(tert-butyl styrene-polybutadiene-poly(tert-butyl styrene) of about 30,000–70,000–30,000 molecular weight.

TABLE VI.—ADHESIVE FORMULATIONS

| Example | Grams of A–B block copolymer | Grams of tackifier | Grams of A–B–A block copolymer |
|---|---|---|---|
| 13 | 10 | 7.5 | |
| 14 | 10 | 8.25 | 1 |
| 15 | 10 | 12 | 2 |

Shear strength, peel strength, and tack properties were determined for each of these adhesives in the same manner as utilized in Examples 1–8. The test results (Table VII) indicate that these low molecular weight A–B block copolymers provide excellent pressure-sensitive adhesives having outstanding shear strength.

TABLE VII.—ADHESIVE PROPERTIES

| Example number | Coating weight, grains/24 in.² | 180° peel adhesion, oz./½″ | Shear adhesion, min./½″ at 23° C. | Probe tack, gms. |
|---|---|---|---|---|
| 13 | 7.0 | 37 | >3,000 | 50 |
| 14 | 6.2 | 23 | >3,980 | 70 |
| 15 | 6.6 | 19 | >3,960 | 55 |

Example 16

This example illustrates preparation of an A–B block copolymer wherein the A block is poly 2-vinyl pyridine having a molecular weight of about 30,000 and the B block is polybutadiene having a molecular weight of about 100,000.

Twenty-four hundred ml. of analytical reagent grade toluene, previously dried over and distilled from lithium styryl in an argon atmosphere, was charged to the apparatus of Example 1, and 100 ml. distilled therefrom. Next, 1.99 ml. of sec-butyl lithium solution in dry toluene (0.183 gm./cc.) was added at 35° C., and 243.9 gms. of butadiene (99.5%) minimum, Phillips Petroleum Company), previously dried over and distilled from tri-isobutyl aluminum, was added over a period of 50 minutes, the solution temperature increasing to about 61° C. and 73.1 gms. (73.3 ml.) of 2-vinyl pyridine, pre-chilled to about −50° C., was added. The solution turned dark orange and then red, the viscosity increased, and the temperature increased to about −20° C. after 30 minutes. Following 15 minutes of further reaction, 5 ml. of methyl alcohol and 3 gms. of 2,6-ditertiary butyl para cresol ("Ionol" antioxidant, Shell Chemical Co.) were added, the polymer solution being 13.9% solids, and having a Brookfield viscosity of 700 cps. The polymer had an inherent viscosity of 1.06 dl./gm.

After recovery and drying, 10 gms. of this polymer was combined with 7.5 gms. of polyterpene resin (S–1010, Hercules Inc.) in toluene. When tested in the manner used in Examples 1–8 at a coating weight of 6.8 grains/24 in.², this adhesive exhibited a peel strength of 19 ounces per ½ in., a shear time of 7.2 minutes per ½ in. at 23° C. and had excellent tack properties.

Examples 17–18 hTis example illustrates preparation of an A–B block copolymer and pressure-sensitive adhesive wherein the A block is poly-2-vinyl pyridine having a molecular weight of about 30,000 and the B block is polyisoprene having a molecular weight of about 102,000.

Twenty-four hundred ml. of analytical reagent grade toluene, previously dried over and distilled from lithium styryl in an argon atmosphere, was added to the apparatus of Example 1 and 100 ml. distilled therefrom. Next, 0.50 ml. of sec-butyl lithium solution (0.0785 gm./cc.), and 0.95 ml. styrene, previously washed with 10% NaOH and dried with silica gel under argon, were added at 74° C., the solution turning a faint yellow. After 15 minutes, 245 gms. (360 ml.) of isoprene, previously washed with 10% sodium hydroxide and dried over silica gel under argon, and an additional 1.9 ml. of sec-butyl lithium solution were added at 32° C., the solution quickly becoming a straw yellow color. The solution temperature was raised to and maintained at 50° C. for three hours, the solution turning a dark orange, and was then cooled to about −60° C. Next, 72 gms. (72.2 ml.) of 2-vinyl pyridine, chilled to about −60° C., was added. The reaction proceeded rapidly, the solution turning light orange in 20 minutes and light purple after an additional one-half hour with the temperature rising to about 4° C. After an additional 40 minutes of reaction, 5 ml. of methyl alcohol was added at 26° C., the solution immediately becoming milky. The polymer solution was 14.1% solids and had a Brookfield viscosity of 300 cps. The polymer was recovered in 100% yield and had an inherent viscosity of 0.97.

The A–B block copolymer, polyterpene resin ("Piccolyte" S–115, Pennsylvania Industrial Chemical Company), and multi-block copolymer were combined in the ratios shown in Table VIII, each adhesive being prepared at 16% solids in toluene. The multi-block A–B–A' block copolymer was poly - 2 - vinylpyridine-polyisoprene-polystyrene of about 15,000–70,000–15,000 molecular weight.

TABLE VIII.—ADHESIVE COMPOSITION

| Example | Grams of A–B block copolymer | Grams of tackifier | Grams of A–B–A' block copolymer |
|---|---|---|---|
| 17 | 10 | 3 | |
| 18 | 10 | 3.6 | 2 |

Shear strength, peel strength, and tack properties were determined in the same manner as was utilized in Examples 1–8. The test results (Table IX) indicate that this low molecular weight A–B block copolymer provides excellent pressure-sensitive adhesives having good shear strength.

TABLE IX.—ADHESIVE PROPERTIES

| Example number | Coating weight, grains/24 in.² | 180° peel adhesion, oz./½" | Shear adhesion, min./½" at 23°C. | Probe tack, gms. |
|---|---|---|---|---|
| 17 | 5.3 | 14 | 10 | 50 |
| 18 | 5.2 | 30 | 57 | 58 |

What is claimed is:

1. A normally tacky and pressure-sensitive adhesive composition having excellent shear strength and creep resistance, particularly at elevated temperatures, together with good peel strength and tack properties, said adhesive comprising: (1) an A-B block copolymer having a number average molecular weight of at least about 50,000, a glass transition temperature above about 75° C., and a glass transition temperature below about −20° C., as determined by torsion pendulum, and consisting essentially of two connected polymer blocks, each block being formed of monomer which is substantially absent from the other block, wherein;
    the A block is normally thermoplastic, glassy, has a glass transition temperature above about 75° C. as determined by torsion pendulum, a number average molecular weight of at least about 15,000, comprises about 20 to about 50% by weight of the total block copolymer molecular weight, and is a polymer consisting essentially of a monomer selected from the group consisting of vinyl substituted aromatic compounds, vinyl pyridine and methyl methacrylate and the B block is thermoplastic, normally elastomeric and amorphous at temperatures above −20° C., has a glass transition temperature below about −20° C., as determined by torsion pendulum, has a number average molecular weight of at least about 35,000; comprises about 80 to about 50% by weight of the total block copolymer molecular weight, and is a polymer consisting essentially of a conjugated diene and (2) about 10 to about 150 parts by weight of at least one compatible tackifying resin per 100 parts by weight of A-B block copolymer.

2. The adhesive of claim 1 wherein the A block is selected from the group consisting of polystyrene, poly-tert-butyl styrene, poly alpha-methyl styrene, poly-2-vinyl pyridine, and polymethyl methacrylate.

3. The adhesive of claim 1 wherein the B block is selected from the group consisting of polybutadiene, polyisoprene, hydrogenated polyisoprene, and hydrogenated polybutadiene.

4. The adhesive of claim 2 wherein the A block is polystyrene and the B block is polyisoprene.

5. The adhesive of claim 1 wherein said resin is a polyterpene.

6. The adhesive of claim 1 wherein said resin is a hydrocarbon resin having a molecular weight less than 2000 and selected from the group consisting of copolymers from mixtures of unsaturated hydrocarbons derived from coal tar; copolymers derived from petroleum; polymers derived from one or more terpene; and condensation products of aromatic hydrocarbons with formaldehyde.

7. The adhesive of claim 1 cointaining less than about 30 parts by weight of multi-block copolymer having three or more blocks, per 100 parts by weight of total block polymer.

8. The adhesive of claim 7 wherein said multi-block copolymer consists essentially of three connected polymer blocks having;
    terminal blocks which are glassy, vinyl aryl polymers having a glass transition temperature above 50° C., and
    an intermediate block which is an amorphous conjugated diene polymer having a glass transition temperature below about −20° C.

9. The adhesive of claim 8 wherein the terminal block of said multi-block copolymer is polystyrene.

10. The adhesive of claim 8 wherein the intermediate block of said multi-block copolymer is polyisoprene.

11. The adhesive of claim 8 wherein said resin is a polyterpene.

12. A sheet material coated on at least one major surface with the adhesive of claim 1.

13. The adhesive of claim 1 wherein said resin is a petroleum hydrocarbon resin.

14. The adhesive of claim 8 wherein said resin is a petroleum hydrocarbon resin.

15. A sheet material coated on at least one major surface with the adhesive of claim 7.

16. The adhesive coated sheet material of claim 12 in the form of a pressure-sensitive-adhesive tape wherein said sheet material is thin and flexible.

References Cited
UNITED STATES PATENTS
3,519,585   7/1970   Miller _____ 260—876

MURRAY TILLMAN, Primary Examiner

C. J. SECCURO, Assistant Examiner

U.S. Cl. X.R.
260—77 BB; 117—138 F, 161 A